US012686790B2

(12) United States Patent

Asirvatham et al.

(10) Patent No.: US 12,686,790 B2

(45) Date of Patent: Jul. 21, 2026

(54) POLYMER COMPOSITIONS FOR FORMING AN ENAMEL COATING ON A WIRE

(71) Applicant: AdvanSix Resins & Chemicals LLC, Parsippany, NJ (US)

(72) Inventors: Edward Asirvatham, Chatham, NJ (US); Karttikay Moudgil, Johns Creek, GA (US)

(73) Assignee: AdvanSix Resins & Chemicals LLC, Parsippany, NJ (US)

( * ) Notice: Subject to any disclaimer, the term of this patent is extended or adjusted under 35 U.S.C. 154(b) by 1138 days.

(21) Appl. No.: 17/610,654

(22) PCT Filed: May 21, 2020

(86) PCT No.: PCT/US2020/033941

§ 371 (c)(1),
(2) Date: Nov. 11, 2021

(87) PCT Pub. No.: WO2020/237018

PCT Pub. Date: Nov. 26, 2020

(65) Prior Publication Data

US 2022/0259457 A1 Aug. 18, 2022

Related U.S. Application Data

(60) Provisional application No. 62/851,215, filed on May 22, 2019.

(51) Int. Cl.
*C08K 5/20* (2006.01)
*C09D 179/08* (2006.01)

(52) U.S. Cl.
CPC .................................. *C09D 179/08* (2013.01)

(58) Field of Classification Search
CPC .......... C09D 179/08; C09D 7/20; H01B 3/30; H01B 3/306; C08K 5/20
See application file for complete search history.

(56) References Cited

U.S. PATENT DOCUMENTS 3,560,426 A 2/1971 Adesko
3,716,519 A 2/1973 Yoda et al.
(Continued)

FOREIGN PATENT DOCUMENTS

CN 106062107 A 10/2016
CN 106687540 A 5/2017
(Continued)

OTHER PUBLICATIONS

"Energy Solutions: What Are Wire Enamels?", retrieved from https://www.axalta.com/electricalinsulation_global/en_US/wire-enamels/what-are-wire-enamels.html, 4 pages.
(Continued)

*Primary Examiner* — Jiangtian Xu

(74) *Attorney, Agent, or Firm* — Faegre Drinker Biddle & Reath LLP

(57) ABSTRACT

The present disclosure provides for a coating composition for forming a coating on a wire. The coating composition includes a polyamide-imide resin, a polyimide resin, a polyesterimide resin, or any two or more of these resins and one or more caprolactam-derived solvents. The present disclosure also provides for a method of producing a coating composition for forming a coating on a wire. The method includes providing a polyamide-imide resin, a polyimide resin, a polyesterimide resin, or any two or more of these resins and one or more caprolactam-derived solvents, and mixing the polyamide-imide resin, the polyimide resin, the polyesterimide resin, or the two or more of these resins and the one or more caprolactam-derived solvents until the polyamide-imide resin, the polyimide resin, the polyesterimide resin, or the two or more of these resins is in solution with the one or more caprolactam-derived solvents to produce the coating composition.

19 Claims, 2 Drawing Sheets

(56) References Cited

U.S. PATENT DOCUMENTS

| | | | |
|---|---|---|---|
| 3,853,817 | A | 12/1974 | Weddleton |
| 3,917,892 | A | 11/1975 | Kawaguchi et al. |
| 3,936,404 | A | 2/1976 | Shizuka et al. |
| 4,007,146 | A | 2/1977 | Ishizuka et al. |
| 4,073,788 | A | 2/1978 | Peterson |
| 4,319,006 | A | 3/1982 | Yamada et al. |
| 4,375,528 | A | 3/1983 | Lange |
| 4,511,624 | A | 4/1985 | Kawaguchi et al. |
| 4,552,950 | A | 11/1985 | McCready |
| 4,556,688 | A | 12/1985 | McCready et al. |
| 5,004,795 | A | 4/1991 | Zecher et al. |
| 6,479,581 | B1 | 11/2002 | Ireland et al. |
| 7,521,498 | B2 | 4/2009 | Stevens et al. |
| 8,685,536 | B2 | 4/2014 | Kikuchi et al. |
| 9,109,079 | B2 | 8/2015 | Lienert et al. |
| 2008/0153993 | A1 | 6/2008 | Boehm et al. |
| 2011/0152426 | A1 | 6/2011 | Cancilleri et al. |
| 2013/0133920 | A1 | 5/2013 | Boehm et al. |
| 2014/0212665 | A1 * | 7/2014 | Ushiwata ............... H01B 3/303 428/375 |
| 2015/0299513 | A1 * | 10/2015 | Kelly ................... C09D 179/08 524/96 |
| 2016/0208097 | A1 | 7/2016 | Bu et al. |
| 2020/0223974 | A1 | 7/2020 | Asirvatham et al. |

FOREIGN PATENT DOCUMENTS

| | | | | |
|---|---|---|---|---|
| GB | 2075999 | A | | 11/1981 |
| JP | 48-014193 | B1 | | 5/1973 |
| JP | 57-014621 | A | | 1/1982 |
| JP | 58-162638 | A | | 9/1983 |
| JP | H1129705 | A | * | 2/1999 |
| JP | 2020-525637 | A | | 8/2020 |
| WO | 2013/106421 | A1 | | 7/2013 |
| WO | 2013/107822 | A1 | | 7/2013 |
| WO | 2015/161131 | A1 | | 10/2015 |
| WO | 2019/005596 | A1 | | 1/2019 |

OTHER PUBLICATIONS

Anton, et al. "Wire Enamels—An Application for High Performance Polymers Unknown to Chemists," Macromolecular Materials and Engineering, vol. 293, 2008, pp. 331-339.

International Search Report and Written Opinion received for PCT Patent Application No. PCT/US2020/033941, mailed on Aug. 13, 2020, 13 pages.

International Preliminary Report on Patentability received for PCT Patent Application No. PCT/US2020/033941, mailed on Dec. 2, 2021, 7 pages.

* cited by examiner

POLYMER COMPOSITIONS FOR FORMING AN ENAMEL COATING ON A WIRE

CROSS REFERENCE TO RELATED APPLICATIONS

This application is a U.S. 371 National Stage Patent Application of International Application No. PCT/US2020/033941, filed May 21, 2020, entitled POLYMER COMPOSITIONS FOR FORMING AN ENAMEL COATING ON A WIRE, which claims the benefit of U.S. Provisional Patent Application Ser. No. 62/851,215, filed May 22, 2019, entitled POLYMER COMPOSITIONS FOR FORMING AN ENAMEL COATING ON A WIRE, the disclosures of which are incorporated by reference herein in their entireties.

FIELD

The present disclosure relates to polymer compositions for forming an enamel coating a wire. In particular, the disclosure relates to polymer coating compositions including a polyimide resin, a polyesterimide resin, a polyamide-imide resin or a combination of two or more of such resins in solution with one or more caprolactam-derived solvents.

BACKGROUND

Wire enamels are durable, heat resistant coatings applied to aluminum or copper wires which may be used in high current, high temperature applications, such as transformers, motors and generators, for example. The wire enamels are generally formed by coating the wire with a coating composition including a resin in solution with a solvent. Once the wire is coated, the coating and wire are heated to evaporate the solvent and cure the resin, forming a heat-resistant, insulative enamel coating on the wire.

Various resins are used to form wire enamels. The selection of the resin depends on the temperature requirements for a particular application, as well as the cost of the resin. For example, polyimide resins may be used to form high quality wire enamels able to withstand temperatures of 260° C. However, polyimide resins are also relatively expensive. Polyamide-imide resins are also used to form high quality wire enamels able to withstand temperature of 220° C., which is more than sufficient for a wide variety of applications. Polyamide-imide resins are generally less than half the cost of polyimide resins.

Polyamide-imide, polyimide or polyesterimide resins used in coating compositions are only partially imidized so that they can dissolve in a suitable solvent. Once the composition is coated onto a wire, the coating is heated to cure the coating by fully imidizing the polyamide-imide, polyimide or polyesterimide resin and drive off the solvent. Solvents in commercially available coating compositions may include N-methyl pyrrolidone in combination with less costly organic solvents. However, the use of N-methyl pyrrolidone is being phased out because it is classified as toxic for reproduction, category 1B (see Regulation (EC) No 1271/2008 of the European Parliament and of the Council). Thus, there is a need for new solvents to replace N-methyl pyrrolidone for use in forming wire enamel coatings.

SUMMARY

The present disclosure provides a coating composition for forming a coating on a wire. The coating composition includes a polyamide-imide resin, polyimide resin, polyesterimide resin, or a combination of any two or more of these resins, and one or more caprolactam-derived solvents according to the general formula:

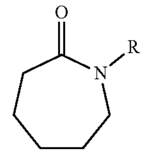

R is a linear alkyl group of 2 or 4 unsubstituted carbons or an alkoxymethyl group of 2 or 3 unsubstituted carbons.

In one form thereof, the present disclosure provides a coating composition for forming a coating on a wire. The coating composition includes a polyamide-imide resin, polyimide resin, polyesterimide resin, or a combination of any two or more of these resins, and one or more caprolactam-derived solvents according to the general formula:

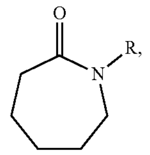

in which R is a linear alkyl group of 2 or 4 unsubstituted carbons or an alkoxymethyl group of 2 or 3 unsubstituted carbons. The polyamide-imide resin, polyimide resin, polyesterimide resin, or combination of any two or more of these resins is in solution with the one or more caprolactam-derived solvents.

The one or more caprolactam-derived solvents may be 10 wt. % to 90 wt. % of the total weight of the coating composition.

The one or more caprolactam-derived solvents may include at least one selected from the group of: N-ethylcaprolactam, N-butylcaprolactam, N-(methoxymethyl)caprolactam, and N-(ethoxymethyl)caprolactam.

The one or more caprolactam-derived solvents may include two caprolactam-derived solvents. Each of the two caprolactam-derived solvents may be from 5 wt. % to 95 wt. % of the one or more caprolactam-derived solvents. The two caprolactam-derived solvents may be N-ethylcaprolactam and N-butylcaprolactam. The two caprolactam-derived solvents may be N-ethylcaprolactam and N-(methoxymethyl)caprolactam. The two caprolactam-derived solvents may be N-ethylcaprolactam and N-(ethoxymethyl)caprolactam. The two caprolactam-derived solvents may be N-butylcaprolactam and N-(methoxymethyl)caprolactam. The two caprolactam-derived solvents may be N-butylcaprolactam and N-(ethoxymethyl)caprolactam. The two caprolactam-derived solvents may be N-(methoxymethyl)caprolactam and N-(ethoxymethyl)caprolactam.

The coating composition may further include a third caprolactam-derived solvent. Each of the three caprolactam-derived solvents may be from 5 wt. % to 90 wt. % of the three caprolactam-derived solvents.

The one or more caprolactam-derived solvents may include N-ethylcaprolactam, N-butylcaprolactam, N-(methoxymethyl)caprolactam, and N-(ethoxymethyl)caprolactam.

The polyamide-imide resin, polyimide resin, polyesterimide resin, or combination of any two or more of these resins may be less than 80% imidized. The polyamide-imide resin, polyimide resin, polyesterimide resin, or combination of any two or more of these resins may be 5 wt. % to 50 wt. % of the coating composition.

The coating composition may further include a co-solvent. The co-solvent may be an organic solvent having a vapor pressure greater than any of the one or more caprolactam-derived solvents.

The coating composition may have a dynamic viscosity ranging from about 500 cP to about 10,000 cP.

In another form thereof, the present disclosure provides for a method of producing a coating composition for forming a coating on a wire. The method includes providing a polyamide-imide resin, polyimide resin, polyesterimide resin, or a combination of any two or more of these resins, and one or more caprolactam-derived solvents according to the general formula:

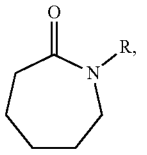

in which R is a linear alkyl group of 2 or 4 unsubstituted carbons or an alkoxymethyl group of 2 or 3 unsubstituted carbons, and mixing the polyamide-imide resin, polyimide resin, polyesterimide resin, or combination of any two or more of these resins and the one or more caprolactam-derived solvents until the polyamide-imide resin, polyimide resin, polyesterimide resin, or combination of any two or more of these resins is in solution with the one or more caprolactam-derived solvents to produce the coating composition.

The method may further include mixing a co-solvent into the coating composition, wherein the co-solvent is an organic solvent having a vapor pressure greater than any of the one or more caprolactam-derived solvents.

The above mentioned and other features of the invention, and the manner of attaining them, will become more apparent and the invention itself will be better understood by reference to the following description.

DETAILED DESCRIPTION

Figure 1:
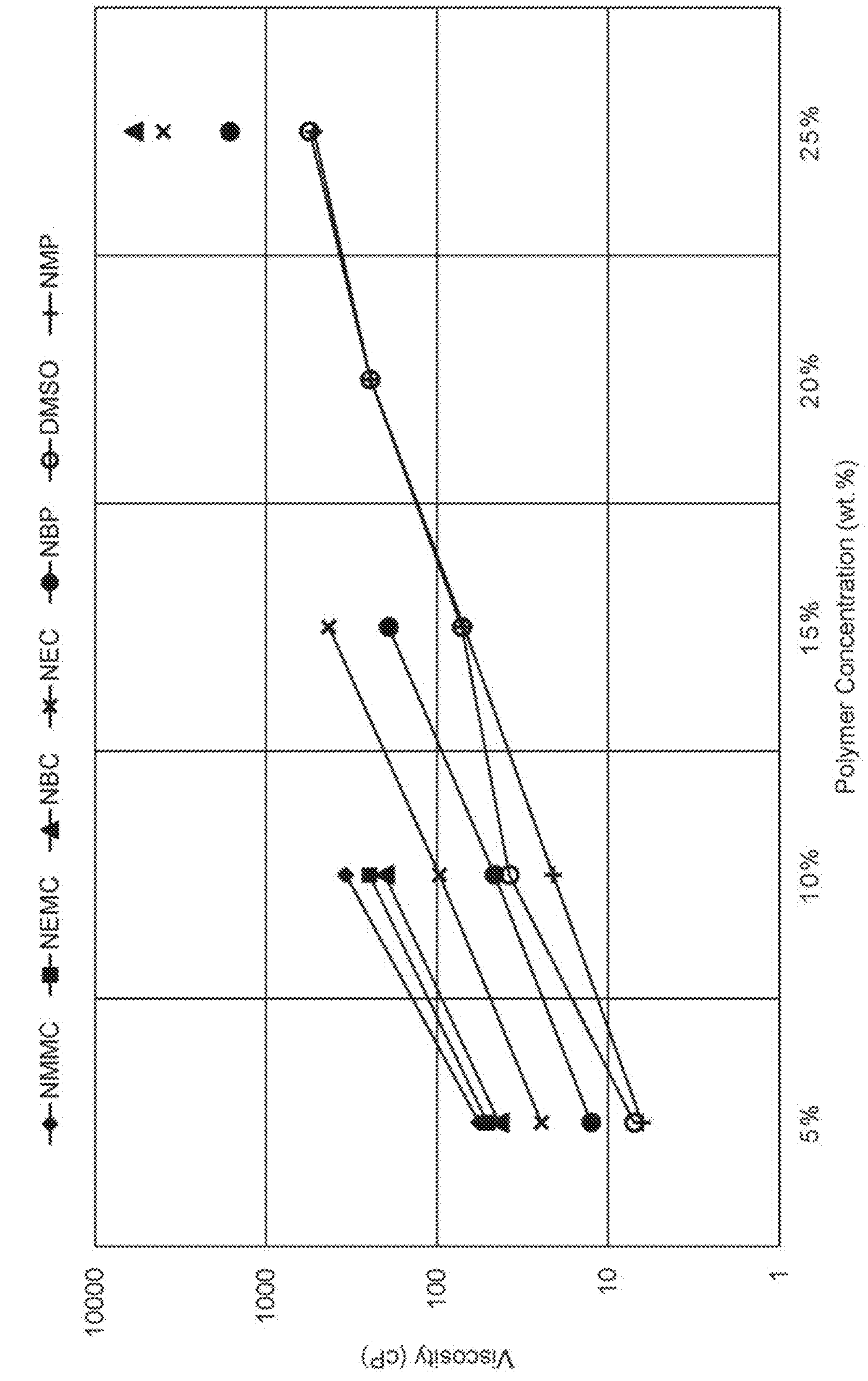
FIG. 1 is a graph of measured dynamic viscosities as function of polyamide-imide concentration for coating compositions, according to this disclosure.

The present disclosure provides for coating compositions for forming a polymer coating on a wire, and for making such coating compositions. The coating compositions include a polyamide-imide resin, polyimide resin, polyesterimide resin, or a combination of any two or more of these resins, and one or more caprolactam-derived solvents described below, instead of N-methyl pyrrolidone. It has been found that such coating compositions are able to form high quality wire enamels comparable to coating compositions using N-methyl pyrrolidone as a solvent. Advantageously, at least some of the one or more caprolactam-derived solvents according to this disclosure are able to provide higher viscosity coating compositions for a given concentration of polyamide-imide resin, polyimide resin or polyesterimide resin, or combination of any two or more of these resins, compared to comparable coating compositions using N-methyl pyrrolidone. This may be beneficial because a higher percentage of lower-cost organic solvents may then be used to achieve a coating composition viscosity suitable for wire coating, resulting in a lower overall coating composition cost.

The polyamide-imide resin, polyimide resin or polyesterimide resin may be formed by way of various reactions. For example, a polyamide-imide resin may be formed from the reaction of methylene dianiline with trimellitic anhydride chloride, according to Reaction 1:

Reaction 1

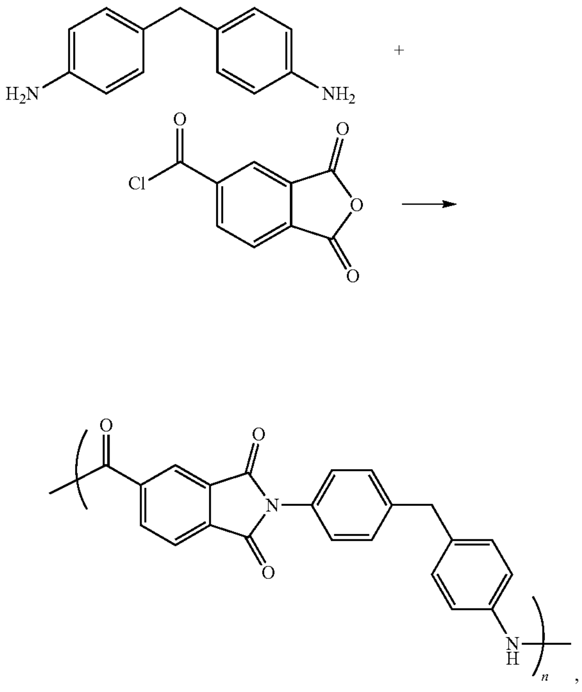

wherein n can be n integer from 10 to 150. Hydrochloric acid is also produced as a byproduct of Reaction 1.

The polyamide-imide resin may be produced according to Reaction 1 by reacting trimellitic anhydride chloride with about a mole equivalent of methylene diphenyl diisocyanate in one or more caprolactam-derived solvents described below. The mole ratio of trimellitic anhydride chloride to methylene diphenyl diisocyanate may range from about 1:1 to about 1:1.2.

In another example, the polyamide-imide resin may be formed from the reaction of methylene diphenyl diisocyanate and trimellitic anhydride, according to Reaction 2:

Reaction 2

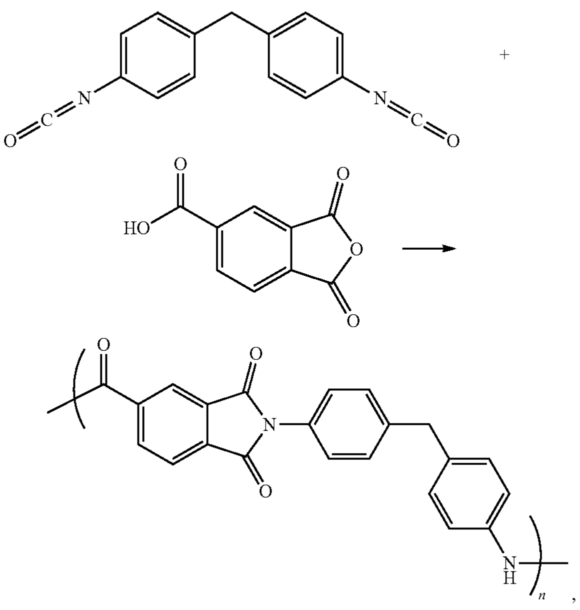

wherein n can be n integer from 10 to 150. Carbon dioxide is also produced as a byproduct of Reaction 2.

The polyamide-imide resin may be produced according to Reaction 2 by reacting trimellitic anhydride with about a mole equivalent of methylene diphenyl diisocyanate in one or more caprolactam-derived solvents described below. The mole ratio of trimellitic anhydride to methylene diphenyl diisocyanate may range from about 1:1 to about 1:1.2. Completion of the reaction is indicated when no further carbon dioxide is produced.

The production of polyamide-imide resin according to Reaction 2 may be at a temperature ranging from 80° C. to 130° C. and for a time ranging from about 2 hours to about 5 hours.

The production of a polyimide resin, such as the polyimide resin according to Formula I, for example, may be according to similar processes known in the art:

Formula I

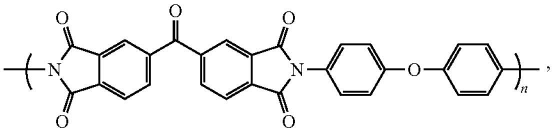

wherein n can be n integer from 10 to 150.

The production of a polyesterimide resin, such as the polyesterimide resin according to Formula II, for example, may be according to similar processes known in the art:

Formula II

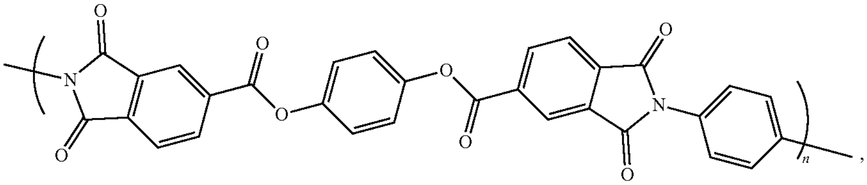

wherein n can be n integer from 10 to 150.

The polyamide-imide resin, polyimide resin, polyester-imide resin, or combination of any two or more of these resins may be partially imidized, with some of the polymer in an imidized form and some of the polymer in an intermediate, un-imidized form. For example, Reactions 1 and 2 shown polyamide-imide in imidized form. Polyamide-imide in the intermediate, un-imidized form is shown in Formula III:

Formula III

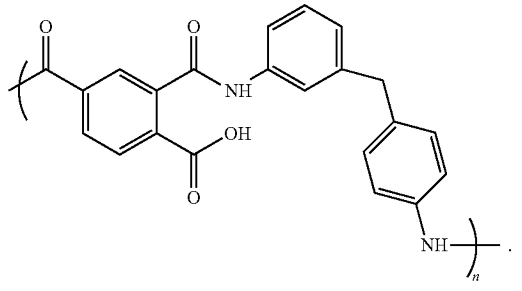

The polyamide-imide resin, polyimide resin, polyester-imide resin, or combination of any two of these resins may be imidized as little as 20%, 25%, 30%, 35%, 40%, 45%, or 50%, or as much as 55%, 60%, 65%, 70%, 75%, or 80%, or be imidized within any range defined between any two of the foregoing values, such as 20% to 80%, 25% to 75%, 30% to 70%, 35% to 65%, 40% to 60%, 45% to 55%, 50% to 80%, 60% to 80%, or 70% to 80%, for examples.

The one or more caprolactam-derived solvents may be according to the general Formula IV:

Formula IV

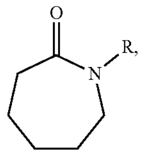

in which R is a linear, alkyl group of 2 or 4 unsubstituted carbons, or an alkoxymethyl group of 2 or 3 unsubstituted carbons. For example, If R is an ethyl group ($—CH_2CH_3$), then the caprolactam-derived solvent is N-ethylcaprolactam according to Formula V:

Formula V

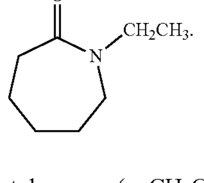

If R is a butyl group ($—CH_2CH_2CH_2CH_3$), then the caprolactam-derived solvent is N-butylcaprolactam according to Formula VI:

Formula VI

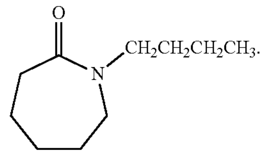

If R is a methoxymethyl group ($—CH_2OCH_3$), then the caprolactam-derived solvent is N-(methoxymethyl)caprolactam according to Formula VII:

Formula VII

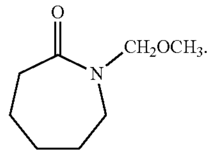

If R is an ethoxymethyl group ($—CH_2OCH_2CH_3$), then the caprolactam-derived solvent is N-(ethoxymethyl)caprolactam according to Formula VIII:

Formula VIII

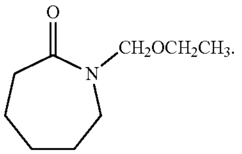

The one or more caprolactam-derived solvent may include N-ethylcaprolactam, N-butylcaprolactam, N-(methoxymethyl)caprolactam, N-(ethoxymethyl)caprolactam, or any combinations thereof. The one or more caprolactam-derived solvent may consist of any one of the foregoing caprolactam-derived solvents. The one or more caprolactam-derived solvent may include two of the caprolactam-derived solvents. For example, the caprolactam-derived solvents may include N-ethylcaprolactam and N-butylcaprolactam. The caprolactam-derived solvents may include N-ethylcaprolactam and N-(methoxymethyl)caprolactam. The caprolactam-derived solvents may include N-ethylcaprolactam and N-(ethoxymethyl)caprolactam. The caprolactam-derived solvents may include N-butylcaprolactam and N-(methoxymethyl)caprolactam. The caprolactam-derived solvents may include N-butylcaprolactam and N-(ethoxymethyl)caprolactam. The caprolactam-derived solvents may include N-(methoxymethyl)caprolactam and N-(ethoxymethyl)caprolactam. The caprolactam-derived solvents may consist of N-ethylcaprolactam and N-butylcaprolactam. The caprolactam-derived solvents may consist of N-ethylcaprolactam and N-(methoxymethyl) caprolactam. The caprolactam-derived solvents may consist of N-ethylcaprolactam and N-(ethoxymethyl)caprolactam. The caprolactam-derived solvents may consist of N-butylcaprolactam and N-(methoxymethyl)caprolactam. The caprolactam-derived solvents may consist of N-butylcaprolactam and N-(ethoxymethyl)caprolactam. The caprolactam-derived solvents may consist of N-(methoxymethyl) caprolactam and N-(ethoxymethyl)caprolactam.

In coating compositions in which the one or more caprolactam-derived solvent includes two of the caprolactam-derived solvents, each of the caprolactam-derived solvents can be may be as little as 5 weight percent (wt. %), 6 wt. %, 8 wt. %, 10 wt. %, 15 wt. %, 20 wt. %, 25 wt. %, 30 wt. %, 33 wt. %, 35 wt. %, 40 wt. %, 45 wt. %, or 49 wt. %, or as great as 51 wt. %, 55 wt. %, 60 wt. %, 65 wt. %, 67 wt. %, 70 wt. %, 75 wt. %, 80 wt. %, 85 wt. %, 90 wt. %, 92 wt. %, 94 wt. %, or 95 wt. % of the total weight of the two caprolactam-derived solvents, or may be within any range defined between any two of the foregoing values, such as, 5 wt. % to 95 wt. %, 6 wt. % to 94 wt. %, 8 wt. % to 92 wt. %, 10 wt. % to 90 wt. %, 15 wt. % to 85 wt. %, 20 wt. % to 80 wt. %, 25 wt. % to 75 wt. %, 30 wt. % to 70 wt. %, 33 wt. % to 67 wt. %, 35 wt. % to 65 wt. %, 40 wt. % to 60, 45 wt. % to 55 wt. %, wt. %, or 49 wt. % to 51 wt. %, for example.

In coating compositions in which the one or more caprolactam-derived solvent includes N-ethylcaprolactam and N-butylcaprolactam, each of the caprolactam-derived solvents can be may be as little as 5 weight percent (wt. %), 6 wt. %, 8 wt. %, 10 wt. %, 15 wt. %, 20 wt. %, 25 wt. %, 30 wt. %, 33 wt. %, 35 wt. %, 40 wt. %, 45 wt. %, or 49 wt. %, or as great as 51 wt. %, 55 wt. %, 60 wt. %, 65 wt. %, 67 wt. %, 70 wt. %, 75 wt. %, 80 wt. %, 85 wt. %, 90 wt. %, 92 wt. %, 94 wt. %, or 95 wt. % of the total weight of the two caprolactam-derived solvents, or may be within any range defined between any two of the foregoing values, such as, 5 wt. % to 95 wt. %, 6 wt. % to 94 wt. %, 8 wt. % to 92 wt. %, 10 wt. % to 90 wt. %, 15 wt. % to 85 wt. %, 20 wt. % to 80 wt. %, 25 wt. % to 75 wt. %, 30 wt. % to 70 wt. %, 33 wt. % to 67 wt. %, 35 wt. % to 65 wt. %, 40 wt. % to 60, 45 wt. % to 55 wt. %, wt. %, or 49 wt. % to 51 wt. %, for example.

In coating compositions in which the one or more caprolactam-derived solvent includes N-ethylcaprolactam and N-(methoxymethyl)caprolactam, each of the caprolactam-derived solvents can be may be as little as 5 weight percent (wt. %), 6 wt. %, 8 wt. %, 10 wt. %, 15 wt. %, 20 wt. %, 25 wt. %, 30 wt. %, 33 wt. %, 35 wt. %, 40 wt. %, 45 wt. %, or 49 wt. %, or as great as 51 wt. %, 55 wt. %, 60 wt. %, 65 wt. %, 67 wt. %, 70 wt. %, 75 wt. %, 80 wt. %, 85 wt. %, 90 wt. %, 92 wt. %, 94 wt. %, or 95 wt. % of the total weight of the two caprolactam-derived solvents, or may be within any range defined between any two of the foregoing values, such as, 5 wt. % to 95 wt. %, 6 wt. % to 94 wt. %, 8 wt. % to 92 wt. %, 10 wt. % to 90 wt. %, 15 wt. % to 85 wt. %, 20 wt. % to 80 wt. %, 25 wt. % to 75 wt. %, 30 wt. % to 70 wt. %, 33 wt. % to 67 wt. %, 35 wt. % to 65 wt. %, 40 wt. % to 60, 45 wt. % to 55 wt. %, wt. %, or 49 wt. % to 51 wt. %, for example.

In coating compositions in which the one or more caprolactam-derived solvent includes N-ethylcaprolactam and N-(ethoxymethyl)caprolactam, each of the caprolactam-derived solvents can be may be as little as 5 weight percent (wt. %), 6 wt. %, 8 wt. %, 10 wt. %, 15 wt. %, 20 wt. %, 25 wt. %, 30 wt. %, 33 wt. %, 35 wt. %, 40 wt. %, 45 wt. %, or 49 wt. %, or as great as 51 wt. %, 55 wt. %, 60 wt. %, 65 wt. %, 67 wt. %, 70 wt. %, 75 wt. %, 80 wt. %, 85 wt. %, 90 wt. %, 92 wt. %, 94 wt. %, or 95 wt. % of the total weight of the two caprolactam-derived solvents, or may be within any range defined between any two of the foregoing values, such as, 5 wt. % to 95 wt. %, 6 wt. % to 94 wt. %, 8 wt. % to 92 wt. %, 10 wt. % to 90 wt. %, 15 wt. % to 85 wt. %, 20 wt. % to 80 wt. %, 25 wt. % to 75 wt. %, 30 wt. % to 70 wt. %, 33 wt. % to 67 wt. %, 35 wt. % to 65 wt. %, 40 wt. % to 60, 45 wt. % to 55 wt. %, wt. %, or 49 wt. % to 51 wt. %, for example.

In coating compositions in which the one or more caprolactam-derived solvent includes N-butylcaprolactam and N-(methoxymethyl)caprolactam, each of the caprolactam-derived solvents can be may be as little as 5 weight percent (wt. %), 6 wt. %, 8 wt. %, 10 wt. %, 15 wt. %, 20 wt. %, 25 wt. %, 30 wt. %, 33 wt. %, 35 wt. %, 40 wt. %, 45 wt. %, or 49 wt. %, or as great as 51 wt. %, 55 wt. %, 60 wt. %, 65 wt. %, 67 wt. %, 70 wt. %, 75 wt. %, 80 wt. %, 85 wt. %, 90 wt. %, 92 wt. %, 94 wt. %, or 95 wt. % of the total weight of the two caprolactam-derived solvents, or may be within any range defined between any two of the foregoing values, such as, 5 wt. % to 95 wt. %, 6 wt. % to 94 wt. %, 8 wt. % to 92 wt. %, 10 wt. % to 90 wt. %, 15 wt. % to 85 wt. %, 20 wt. % to 80 wt. %, 25 wt. % to 75 wt. %, 30 wt. % to 70 wt. %, 33 wt. % to 67 wt. %, 35 wt. % to 65 wt. %, 40 wt. % to 60, 45 wt. % to 55 wt. %, wt. %, or 49 wt. % to 51 wt. %, for example.

In coating compositions in which the one or more caprolactam-derived solvent includes N-butylcaprolactam and N-(ethoxymethyl)caprolactam, each of the caprolactam-derived solvents can be may be as little as 5 weight percent (wt. %), 6 wt. %, 8 wt. %, 10 wt. %, 15 wt. %, 20 wt. %, 25 wt. %, 30 wt. %, 33 wt. %, 35 wt. %, 40 wt. %, 45 wt. %, or 49 wt. %, or as great as 51 wt. %, 55 wt. %, 60 wt. %, 65 wt. %, 67 wt. %, 70 wt. %, 75 wt. %, 80 wt. %, 85 wt. %, 90 wt. %, 92 wt. %, 94 wt. %, or 95 wt. % of the total weight of the two caprolactam-derived solvents, or may be within any range defined between any two of the foregoing values, such as, 5 wt. % to 95 wt. %, 6 wt. % to 94 wt. %, 8 wt. % to 92 wt. %, 10 wt. % to 90 wt. %, 15 wt. % to 85 wt. %, 20 wt. % to 80 wt. %, 25 wt. % to 75 wt. %, 30 wt. % to 70 wt. %, 33 wt. % to 67 wt. %, 35 wt. % to 65 wt. %, 40 wt. % to 60, 45 wt. % to 55 wt. %, wt. %, or 49 wt. % to 51 wt. %, for example.

In coating compositions in which the one or more caprolactam-derived solvent includes N-(methoxymethyl)caprolactam and N-(ethoxymethyl)caprolactam, each of the caprolactam-derived solvents can be may be as little as 5 weight percent (wt. %), 6 wt. %, 8 wt. %, 10 wt. %, 15 wt. %, 20 wt. %, 25 wt. %, 30 wt. %, 33 wt. %, 35 wt. %, 40 wt. %, 45 wt. %, or 49 wt. %, or as great as 51 wt. %, 55 wt. %, 60 wt. %, 65 wt. %, 67 wt. %, 70 wt. %, 75 wt. %, 80 wt. %, 85 wt. %, 90 wt. %, 92 wt. %, 94 wt. %, or 95 wt. % of the total weight of the two caprolactam-derived solvents, or may be within any range defined between any two of the foregoing values, such as, 5 wt. % to 95 wt. %, 6 wt. % to 94 wt. %, 8 wt. % to 92 wt. %, 10 wt. % to 90 wt. %, 15 wt. % to 85 wt. %, 20 wt. % to 80 wt. %, 25 wt. % to 75 wt. %, 30 wt. % to 70 wt. %, 33 wt. % to 67 wt. %, 35 wt. % to 65 wt. %, 40 wt. % to 60, 45 wt. % to 55 wt. %, wt. %, or 49 wt. % to 51 wt. %, for example.

The one or more caprolactam-derived solvent may include any three of the caprolactam-derived solvents. For example, the caprolactam-derived solvents may include N-ethylcaprolactam, N-butylcaprolactam and N-(methoxymethyl)caprolactam. The caprolactam-derived solvents may include N-ethylcaprolactam, N-butylcaprolactam and N-(ethoxymethyl)caprolactam. The caprolactam-derived solvents may include N-butylcaprolactam, N-(methoxymethyl)caprolactam and N-(ethoxymethyl) caprolactam. The caprolactam-derived solvents may consist of N-ethylcaprolactam, N-butylcaprolactam and N-(methoxymethyl)caprolactam. The caprolactam-derived solvents may consist of N-ethylcaprolactam, N-butylcaprolactam and N-(ethoxymethyl)caprolactam. The caprolactam-derived solvents may consist of N-butylcaprolactam, N-(methoxymethyl)caprolactam and N-(ethoxymethyl) caprolactam.

In coating compositions in which the one or more caprolactam-derived solvent includes three of the caprolactam-derived solvents, each of the caprolactam-derived solvents can be as little as 5 wt. %, 6 wt. %, 8 wt. %, 10 wt. %, 15 wt. %, 20 wt. %, 25 wt. %, 30 wt. %, 33 wt. %, 35 wt. %, 40 wt. %, 45 wt. %, or 49 wt. %, or as great as 50 wt. %, 55 wt. %, 60 wt. %, 65 wt. %, 67 wt. %, 70 wt. %, 75 wt. %, 80 wt. %, 84 wt. %, 88 wt. %, or 90 wt. % of the total weight of the three caprolactam-derived solvents, or be within any range defined between any two of the foregoing values, such as, 5 wt. % to 90 wt. %, 6 wt. % to 88 wt. %, 8 wt. % to 84 wt. %, 10 wt. % to 80 wt. %, 15 wt. % to 70 wt. %, 20 wt. % to 60 wt. %, or 25 wt. % to 50 wt. %, for example.

In coating compositions in which the one or more caprolactam-derived solvent includes N-ethylcaprolactam, N-butylcaprolactam and N-(methoxymethyl)caprolactam, each of the caprolactam-derived solvents can be as little as 5 wt. %, 6 wt. %, 8 wt. %, 10 wt. %, 15 wt. %, 20 wt. %, 25 wt. %, 30 wt. %, 33 wt. %, 35 wt. %, 40 wt. %, 45 wt. %, or 49 wt. %, or as great as 50 wt. %, 55 wt. %, 60 wt. %, 65 wt. %, 67 wt. %, 70 wt. %, 75 wt. %, 80 wt. %, 84 wt. %, 88 wt. %, or 90 wt. % of the total weight of the three caprolactam-derived solvents, or be within any range defined between any two of the foregoing values, such as, 5 wt. % to 90 wt. %, 6 wt. % to 88 wt. %, 8 wt. % to 84 wt. %, 10 wt. % to 80 wt. %, 15 wt. % to 70 wt. %, 20 wt. % to 60 wt. %, or 25 wt. % to 50 wt. %, for example.

In coating compositions in which the one or more caprolactam-derived solvent includes N-ethylcaprolactam, N-butylcaprolactam and N-(ethoxymethyl)caprolactam, each of the caprolactam-derived solvents can be as little as 5 wt. %, 6 wt. %, 8 wt. %, 10 wt. %, 15 wt. %, 20 wt. %, 25 wt. %, 30 wt. %, 33 wt. %, 35 wt. %, 40 wt. %, 45 wt. %, or 49 wt. %, or as great as 50 wt. %, 55 wt. %, 60 wt. %, 65 wt. %, 67 wt. %, 70 wt. %, 75 wt. %, 80 wt. %, 84 wt. %, 88 wt. %, or 90 wt. % of the total weight of the three caprolactam-derived solvents, or be within any range defined between any two of the foregoing values, such as, 5 wt. % to 90 wt. %, 6 wt. % to 88 wt. %, 8 wt. % to 84 wt. %, 10 wt. % to 80 wt. %, 15 wt. % to 70 wt. %, 20 wt. % to 60 wt. %, or 25 wt. % to 50 wt. %, for example.

In coating compositions in which the one or more caprolactam-derived solvent includes N-butylcaprolactam, N-(methoxymethyl)caprolactam and N-(ethoxymethyl) caprolactam, each of the caprolactam-derived solvents can be as little as 5 wt. %, 6 wt. %, 8 wt. %, 10 wt. %, 15 wt. %, 20 wt. %, 25 wt. %, 30 wt. %, 33 wt. %, 35 wt. %, 40 wt. %, 45 wt. %, or 49 wt. %, or as great as 50 wt. %, 55 wt. %, 60 wt. %, 65 wt. %, 67 wt. %, 70 wt. %, 75 wt. %, 80 wt. %, 84 wt. %, 88 wt. %, or 90 wt. % of the total weight of the three caprolactam-derived solvents, or be within any range defined between any two of the foregoing values, such as, 5 wt. % to 90 wt. %, 6 wt. % to 88 wt. %, 8 wt. % to 84 wt. %, 10 wt. % to 80 wt. %, 15 wt. % to 70 wt. %, 20 wt. % to 60 wt. %, or 25 wt. % to 50 wt. %, for example.

The one or more caprolactam-derived solvent may include four of the caprolactam-derived solvents. In coating compositions in which the one or more caprolactam-derived solvent includes four of the caprolactam-derived solvents, the solvent can include N-ethylcaprolactam, N-butylcaprolactam, N-(methoxymethyl)caprolactam, and N-(ethoxymethyl)caprolactam. The caprolactam-derived solvents can consist of N-ethylcaprolactam, N-butylcaprolactam, N-(methoxymethyl)caprolactam, and N-(ethoxymethyl) caprolactam.

In coating compositions in which the one or more caprolactam-derived solvent includes N-ethylcaprolactam, N-butylcaprolactam, N-(methoxymethyl)caprolactam, and N-(ethoxymethyl)caprolactam, each of the caprolactam-derived solvents can be as little as 5 wt. %, 6 wt. %, 8 wt. %, 10 wt. %, 15 wt. %, 20 wt. %, 25 wt. %, 30 wt. %, 33 wt. %, 35 wt. %, 40 wt. %, 45 wt. %, or 49 wt. %, or as great as 50 wt. %, 55 wt. %, 60 wt. %, 65 wt. %, 67 wt. %, 70 wt. %, 75 wt. %, 80 wt. %, or 85 wt. % of the total weight of the three caprolactam-derived solvents, or be within any range defined between any two of the foregoing values, such as, 5 wt. % to 85 wt. %, 6 wt. % to 80 wt. %, 8 wt. % to 75 wt. %, 10 wt. % to 70 wt. %, 15 wt. % to 65 wt. %, 20 wt. % to 60 wt. %, or 25 wt. % to 50 wt. %, for example.

The one or more caprolactam-derived solvents may be as little as 10 wt. %, 15 wt. %, 20 wt. %, 25 wt. %, 30 wt. %, 35 wt. %, 40 wt. %, 45 wt. %, or 50 wt. %, or as much as 55 wt. %, 60 wt. %, 65 wt. %, 70 wt. %, 75 wt. %, 80 wt. %, 85 wt. %, or 90 wt. % of the total weight of the coating composition, or be within any range defined between any two of the foregoing values, such as 10 wt. % to 90 wt. %, 15 wt. % to 85 wt. %, 20 wt. % to 80 wt. %, 25 wt. %, to 75 wt. %, 30 wt. % to 70 wt. %, 35 wt. % to 65 wt. %, 40 wt. % to 60 wt. %, 45 wt. % to 55 wt. %, 5 wt. % to 50 wt. %, 20 wt. % to 40 wt. %. or 20 wt. % to 30 wt. %, for example.

The coating composition may be produced as described above in which the polyamide-imide resin, polyimide resin, polyesterimide resin, or any two or more of these resins are in solution with, or dissolved in, the one or more caprolactam-derived solvents as a result of producing the resin in a solution of the reactants and the one or more caprolactam derived solvents. For example, a coating composition may be produced as a result of producing the polyamide-imide resin in a solution of the reactants and the one or more caprolactam-derived solvents, according to Reaction 1 or Reaction 2. Alternatively, or additionally, the coating composition may be produced by providing the polyamide-imide resin, polyimide resin, polyesterimide resin, or any two or more of these resins separately and then mixing the polyamide-imide resin, polyimide resin, polyesterimide resin, or any two or more of these resins with the one or more caprolactam-derived solvents until the polyamide-imide resin, polyimide resin, polyesterimide resin, or any two or more of these resins is in solution with the one or more caprolactam-derived solvents. In either case, additional amounts of the one or more caprolactam-derived solvents may be added to produce a coating composition having a desired amount of the polyamide-imide resin, polyimide resin, polyesterimide resin, or any two or more of these resins as a percentage of the total weight of the coating composition.

The polyamide-imide resin, polyimide resin, polyesterimide resin, or any two or more of these resins may be as little as 5 wt. %, 10 wt. %, 15 wt. %, 20 wt. % or 25 wt. %, or as much as 30 wt. %, 35 wt. %, 40 wt. %, 45 wt. %, or 50 wt. % of the total weight of the coating composition, or be within any range defined between any two of the foregoing values, such as 5 wt. % to 50 wt. %, 10 wt. % to 45 wt. %, 15 wt. % to 40 wt. %, 20 wt. % to 35 wt. %, 25 wt. % to 30 wt. %, 20 wt. % to 40 wt. %, or 10 wt. % to 20 wt. %, for example.

The coating composition may further include one or more co-solvents. The co-solvent may be an organic solvent. The co-solvent may be an organic solvent having a boiling point less than any of the one or more caprolactam-derived solvents. The one or more co-solvents may include naphtha, acetone, cyclohexanone, acetanilide, ethyl acetate, aromatic hydrocarbons, such as xylene, or combinations thereof, for example.

For coating compositions according to this disclosure that further include one or more co-solvents, the co-solvent may be as little as 5 wt. %, 7 wt. %, 10 wt. %, 15 wt. %, or 20 wt. %, or as much as 25 wt. %, 30 wt. %, 35 wt. %, or 40 wt. % of the total weight of the coating composition, or be within any range defined between any two of the foregoing values, such as 5 wt. % to 40 wt. %, 7 wt. % to 35 wt. %, 10 wt. % to 30 wt. %, 15 wt. % to 25 wt. %, 20 wt. % to 30 wt. %, 25 wt. % to 40 wt. %, or 30 wt. % to 40 wt. %, for example.

The coating composition may further include the solvent N-methylcaprolactam according to Formula IX:

Formula IX

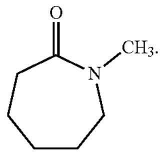

The N-methylcaprolactam may be as little as 0.5 wt. %, 1 wt. %, 2 wt. %, 3 wt. %, or 4 wt. %, or as much as 5 wt. %, 6 wt. %, 8 wt. %, or 10 wt. % of the total weight of the coating composition, or be within any range defined between any two of the foregoing values, such as 0.5 wt. % to 10 wt. %, 1 wt. % to 8 wt. %, 2 wt. % to 6 wt. %, 3 wt. % to 5 wt. %, 0.5 wt. % to 5 wt. %, 0.5 wt. % to 2 wt. %, or 1 wt. % to 5 wt. %, for example.

A dynamic viscosity at 25° C. of coating compositions according to this disclosure may be as low as 500 centipoise (cP), 600 cP, 800 cP, 1,000 cP, 1,300 cP, 1,600 cP, or 2,000 cP, or as high as 2,500 cP, 3,200 cP, 4,000 cP, 5,000 cP, 6,500 cP, 8,000 cP, or 10,000 cP, or be within any range defined between any two of the foregoing values, such as 500 cP to 10,000 cP, 600 cP to 8,000 cP, 800 cP to 6,500 cP, 1,000 cP to 5,000 cP, 1,300 cP to 4,000 cP, 1,600 cP, to 3,200 cP, 2,000 cP to 2,500 cP, 600 cP to 1,000 cP, or 800 cP to 2,000 cP, for example.

In use, the coating compositions can be applied to a wire at a temperature from about 40° C. to about 60° C., and then heated to a first temperature to fully imidize the polyamide-imide resin, polyimide resin, polyesterimide resin, or any two or more of these resins. The coated wire may then be heated to a second temperature higher than the first temperature to drive off water evolved during the imidization process as well as the co-solvent (if any) and some of the one or more caprolactam-derived solvents. The coated wire may then be heated to at third temperature higher than the second temperature to drive off the rest of the one or more caprolactam-derived solvents and increase the molecular weight of the polyamide-imide resin, polyimide resin, polyesterimide resin, or any two or more of these resins to form the wire enamel coating.

Quality of wire enamels can be determined by several criteria including flexibility, adhesion, heat shock, thermosplasticity, breakdown voltage, and thermal class. Flexibility and adhesion of the wire enamel to the wire can be evaluated by inspecting for cracks in the wire enamel and peeling of the wire enamel after the coated wire is elongated from 5% to 20% and then wound around a mandrel. Resistance to heat shock can be evaluated by heating the coated wire to about 200° C., and then inspecting for cracks after the wire is quickly cooled to room temperature. Thermo-plasticity can be evaluated by applying pressure to two enamel-coated wires crossing each other at a point, and then increasing the temperature and observing the temperature at which electrical contact is made between the wires. Breakdown voltage can be evaluated by increasing the RMS voltage of an alternating current applied to an enamel-coated wire at room temperature for 1 minute until electrical breakdown is observed. Thermal class may be evaluated per ASTM D 2307: *Standard Test Method for Thermal Endurance of Film-Insulated Round Magnet Wire.*

The quality of wire enamels can also be determined by conducting a pencil hardness test per ASTM D3363-05 ($2011^{E2}$). The test measures the scratch hardness of coatings, such as an enamel coating. The harder the coating, the more resistant the coating will be to scratching, marring or gouging. The scale of hardness ranges from 6B (softest) to 9H (hardest). The test is conducted by forming the coatings to be tested on substrates, or coupons, and then scratching the coatings with a series of pencils of increasing hardness. The pencil hardness for the coating is the value of the hardest pencil that does not scratch or mar the surface of the coating. The pencil hardness test is best done on a flat coupon as making and comparing a series of linear scratches on a flat substrate may produce more consistent observations than on small-diameter cylinder, such as a coated wire.

Wire enamels formed from coating compositions according to this disclosure are of high quality and are at least wire enamels formed from comparable coating compositions using N-methyl pyrrolidone as a solvent. Advantageously, at least some of the one or more caprolactam-derived solvents according to this disclosure are able to provide higher viscosity coating compositions for a given concentration of polyamide-imide resin, polyimide resin, polyesterimide resin, or any two or more of these resins compared to comparable coating compositions using N-methyl pyrrolidone. This may be beneficial because a higher percentage of lower-cost organic solvents may then be used to achieve a coating composition viscosity suitable for wire coating, resulting in a lower overall coating composition cost.

As used herein, the phrase "within any range defined between any two of the foregoing values" literally means that any range may be selected from any two of the values listed prior to such phrase regardless of whether the values are in the lower part of the listing or in the higher part of the listing. For example, a pair of values may be selected from two lower values, two higher values, or a lower value and a higher value.

While this invention has been described as relative to exemplary designs, the present invention may be further modified within the spirit and scope of this disclosure. Further, this application is intended to cover such departures from the present disclosure as come within known or customary practice in the art to which this invention pertains.

EXAMPLES

Examples 1-7

Comparative Dynamic Viscosity of Coating Compositions

In Examples 1-7, the dynamic viscosities of coating compositions including various weight percentages of a polyamide-imide resin are compared between the caprolactam-derived solvents of the present disclosure and solvents in commercially available coating compositions. The polyamide-imide resin was Torlon® Al-10 powder from Solvay S.A., Brussels, Belgium.

In Example 1, polyamide-imide resin was dissolved in N-ethylcaprolactam (NEC) to make four coating compositions having 5 wt. %, 10 wt. %, 15 wt. %, or 25 wt. % of polyamide-imide resin. In Example 2, polyamide-imide resin was dissolved in N-butylcaprolactam (NBC) to make three coating compositions having 5 wt. %,10 wt. % or 25 wt. % of polyamide-imide resin. In Example 3, polyamide-imide resin was dissolved in N-(methoxymethyl)caprolactam (NMMC) to make three coating compositions having 5 wt. %,10 wt. % and 25 wt. % of polyamide-imide resin. In Example 4, polyamide-imide resin was dissolved in N-(ethoxymethyl)caprolactam (NEMC) to make three coating compositions having 5 wt. %, 10 wt. % or 25 wt. % of polyamide-imide resin. In Example 5, polyamide-imide resin was dissolved in N-methyl pyrrolidone (NMP) to make five coating compositions having 5 wt. %, 10 wt. %, 15 wt. %, 20 wt. % and 25 wt. % of polyamide-imide resin. In Example 6, polyamide-imide resin was dissolved in N-butyl pyrrolidone (NBP) to make four coating compositions having 5 wt. %, 10 wt. %, 15 wt. % or 25 wt. % of polyamide-imide resin. In Example 7, polyamide-imide resin was dissolved in dimethyl sulfoxide (DMSO) to make five coating compositions having 5 wt. %, 10 wt. %, 15 wt. %, 20 wt. % and 25 wt. % of polyamide-imide resin.

The dynamic viscosity of each coating composition was measured using a Brookfield DV-II+ Viscometer using a small sample adapter and spindle 18. The temperature of each coating composition was controlled using a circulation bath at a temperature of 25° C. such that the temperature during the viscosity measurement was 25.0° C.±0.2° C. The results are shown in FIG. 1.

FIG. 1 is a graph of the measured dynamic viscosities as function of polyamide-imide concentration for each of the Examples 1-7. The viscosities at polyamide-imide resin concentrations of 25 wt. % for Example 2 (NBC), Example 3 (NMMC) and Example 4 (NEMC) are omitted from FIG. 1 because they exceeded 10,000 cP. As shown in FIG. 1, the caprolactam-based solvents according to this disclosure have higher dynamic viscosities at each concentration of polyamide-imide resin. This may be beneficial because a higher percentage of lower-cost co-solvents may then be used to achieve a coating composition viscosity suitable for wire coating, resulting in a lower overall coating composition cost.

Examples 8-13

Production of Coating Compositions

In Examples 8-12, the production of coating compositions including the production of polyamide-imide resin according to Reaction 2 is demonstrated. In each of Examples 8-12, 5 g of methylene diphenyl diisocyanate and 3.84 g of trimellitic anhydride were added to a reactor along with 13.36 g in total of one or more caprolactam-derived solvents according to the general Formula IV described above, and as shown in Table 1 below. In Example 12, the two caprolactam-derived solvents were added in equal weights (6.68 g each). The contents of the reactor were mixed together to form a solution. The solution was heated for 2 hours from 80° C. to 125° C. and maintained below 130° C. for an additional 3 hours until no further carbon dioxide was produced. Completion of the reaction was confirmed by the absence of an NCO peak when the Examples were measured by Fourier-transform infrared spectroscopy.

The solution was cooled to room temperature, and then diluted by the addition of 6 g of the same one or more caprolactam-derived solvents used to form the solution. In Example 12, the two caprolactam-derived solvents were added in equal weights (3.0 g each) to preserve the 1:1 ratio of the two solvents.

Example 13 was prepared in the same way as Examples 8-12 described above, except that N-methyl pyrrolidone (NMP) is substituted for the one or more caprolactam-derived solvents.

The dynamic viscosity of each coating composition from Examples 8-13 was measured using a Brookfield DV-II+ Viscometer using a small sample adapter and spindle 18. The temperature of each coating composition was controlled using a circulation bath at a temperature of 25° C. such that the temperature during the viscosity measurement was 25.0° C.±0.2° C. The solids content of each coating composition was measured by placing 3 sets of 0.3 g to 0.5 g samples of each composition in an oven at 165° C. for 4 hours. The results are shown in the Table 1.

The viscosity of some of the coating compositions may be artificially low for the reported solids content because the high boiling point of the caprolactam-derived solvent may result in residual solvent in the composition which would inflate the measured solids content. For example, the N-butylcaprolactam present in Examples 9 and 12 may inflate the reported solids content, leading to an artificially low viscosity for the reported solids content.

As shown in Table 1, the polyamide-imide solutions made using one or more caprolactam-derived solvents according to the general Formula IV described above can be successfully synthesized with properties comparable to polyamide-imide solutions made using N-methyl pyrrolidone.

TABLE 1

| Example | Solvent | Viscosity (cP) | Solids (wt. %) |
|---|---|---|---|
| 8 | N-ethylcaprolactam | 3,689 | 36.2 |
| 9 | N-butylcaprolactam | 2,052 | 34 |
| 10 | N-(methoxymethyl)caprolactam | >10,000 | 43.3 |
| 11 | N-(ethoxymethyl)caprolactam | 4,218 | 45.4 |
| 12 | N-ethylcaprolactam<br>N-butylcaprolactam | 5,393 | 38.4 |
| 13 | N-methyl pyrrolidone | 3,725 | 31.5 |

Examples 14-21

Evaluation of Coating Compositions—Manual Coating

In Examples 14-21, the performance of coating compositions including a polyamide-imide resin is demonstrated using a bench-scale manual coating process. The polyamide-imide resin was Torlon® Al-10 powder from Solvay S.A., Brussels, Belgium. In each of the Examples 14-21, approximately 20 wt. % of the polyamide-imide resin was mixed with a prepared solvent or solvent/co-solvent mixture according to Table 2 below. The mixtures were processed on a shaker table for 24 to 48 hours.

Segments of copper wire (99.99% pure copper, untreated, 0.05 mm in diameter) were prepared on hooks with anchors to maintain them in a straight, vertical orientation. The copper wires were first rinsed with the solvent/solvent mixture as shown in Table 2, and then coated with the corresponding polyamide-imide solution to form ten layers. After each coating layer was applied, the coated wire was dried at 110° C. for 30 minutes. After the final, layer was applied, the coated wires were dried at 225° C.

TABLE 2

| Example | Solvent | Co-Solvent |
|---|---|---|
| 14 | N-methyl pyrrolidone | None |
| 15 | N-butyl pyrrolidone | None |
| 16 | N-methylcaprolactam | None |
| 17 | N-ethylcaprolactam | None |
| 18 | N-methyl pyrrolidone (70 wt. %) | Cyclohexanone (30 wt. %) |
| 19 | N-butyl pyrrolidone (70 wt. %) | Cyclohexanone (30 wt. %) |
| 20 | N-methylcaprolactam (70 wt. %) | Cyclohexanone (30 wt. %) |
| 21 | N-ethylcaprolactam (70 wt. %) | Cyclohexanone (30 wt. %) |

Figure 3:
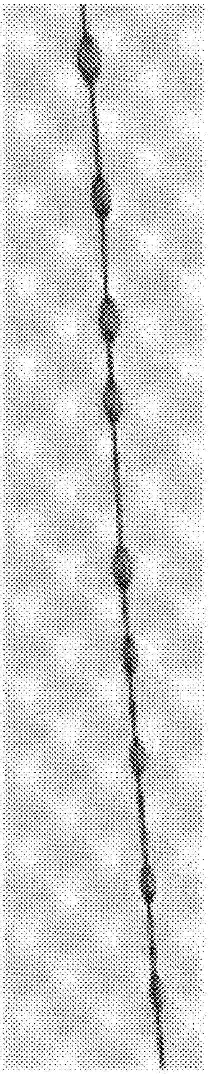
FIG. 3 is a micrograph of a wire coated with a polyamide-imide composition including N-methylcaprolactam as a solvent, according to this disclosure.
Figure 4:
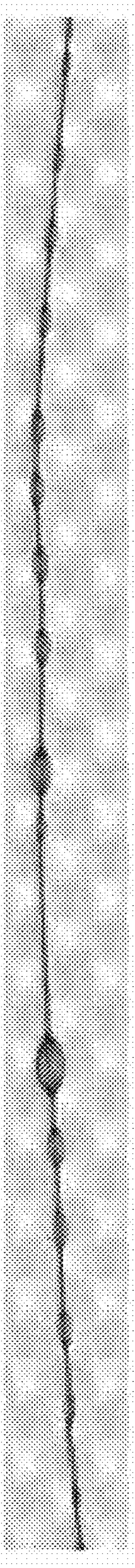
FIG. 4 is a micrograph of a wire coated with a polyamide-imide composition including N-butylcaprolactam as a solvent, according to this disclosure.

The application of the polyamide-imide coating was initially attempted by dipping the wires into the polyamide-imide solution. However, this process consistently resulted in droplets along the wire rather than an even coating. The droplets were easily visible to the unaided eye. Other methods for wetting the wires to build a layered coating were attempted. The most effective method was the use of a pipette without a bulb to apply the solution via capillary action. While the pipette application process still resulted in the formation of droplets, they were much smaller, readily visible only under a microscope, as shown in FIGS. 2-4.

Examples 15 and 19, which included N-butyl pyrrolidone as the primary solvent, did not appear to dissolve the polyamide-imide resin to a significant degree. No coating was observed on wires treated with Examples 15 and 19.

Figure 2:
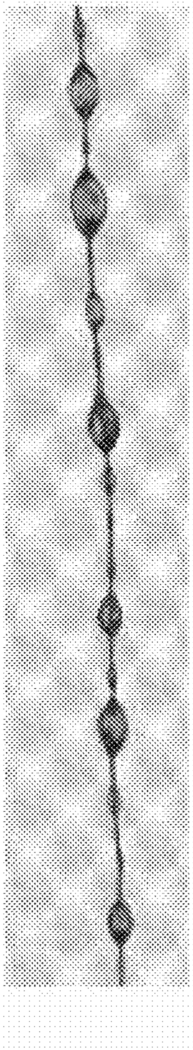
FIG. 2 is a micrograph of a wire coated with a polyamide-imide composition including N-methyl pyrrolidone as a solvent.

FIG. 2 is a micrograph of a wire coated with the polyamide-imide composition of Example 14, including N-methyl pyrrolidone as a solvent. FIG. 3 is a micrograph of a wire coated with the polyamide-imide composition of Example 16, including N-methylcaprolactam as a solvent. FIG. 4 is a micrograph of a wire coated with the polyamide-imide composition of Example 17, including N-ethylcaprolactam as a solvent. Comparing FIGS. 2-4, the coating including N-methyl pyrrolidone formed many large droplets with smaller intermittent droplets (FIG. 2). The coating including N-methylcaprolactam generally had medium-sized droplets with some smaller droplets in between (FIG. 3). The coating including N-ethylcaprolactam had mostly small droplets with a few medium-to-large sized droplets (FIG. 4). Wires coated with Examples 18, 20 and 21, which included cyclohexanone as a solvent, produced similar results. Thus, it was surprisingly found that polyamide-imide compositions including N-methylcaprolactam and N-ethylcaprolactam resulted in a more uniform coating than polyamide-imide compositions including N-methyl pyrrolidone as a solvent. Without wishing to be bound by any theory, it is believed that the solvents or solvents/co-solvent mixtures of the present disclosure provide superior wetting of the copper surface and/or reduced surface tension of the polyamide-imide composition, resulting in improved coating uniformity.

While the bench-top experiments provide some insight into the relative coating uniformity of the various polyamide-imide compositions, none of the results demonstrate the coating uniformity obtainable with the high-speed horizontal coating process used by industry. Thus, it is not predictable and not easily discerned by a person skilled in the art to go from a theoretical good solvent to successful use as a solvent for wire enamel coating simply because there are no bench-top experiments that can properly simulate the industrial use conditions.

Evaluation of the Coating Compositions—High-Speed Horizontal Coating

Each of the coating compositions of Examples 8-13 are coated onto wires using a horizontal coating process, as is known in the art. Flexibility and adhesion of the wire enamel to the wire is evaluated for each Example by inspecting for cracks in the wire enamel and peeling of the wire enamel after the coated wire is elongated from 5% to 20% and then wound around a mandrel. Resistance to heat shock is evaluated for each Example by heating the coated wire to about 200° C., and then inspecting for cracks after the wire is quickly cooled to room temperature. Thermo-plasticity is evaluated for each Example by applying pressure to two enamel-coated wires crossing each other at a point, and then increasing the temperature and observing the temperature at which electrical contact is made between the wires. Breakdown voltage is evaluated for each Example by increasing the RMS voltage of an alternating current applied to an enamel-coated wire at room temperature for 1 minute until electrical breakdown is observed. Thermal class is evaluated for each Example per ASTM D 2307: *Standard Test Method for Thermal Endurance of Film-Insulated Round Magnet Wire*. Dielectric dissipation is evaluated using the tangent-delta test according to IEC 60851. Chemical resistance is evaluated by exposing an enamel-coated wire to solvents commonly used in electrical applications. Examples can include solvents used in varnishes to overcoat enameled wires, such as methanol and toluene, as well as solvents typically in contact with the enamel-coated wire in use, such as transformer oil.

Examples 22-27

Evaluation of Coating Compositions—Pencil Hardness

In Examples 22-27, the pencil hardness of the coating compositions produced with the solvent/solvent mixtures of Examples 14, 15-18 and 20-21 as described above is demonstrated. Examples 15 and 19, which included N-butyl pyrrolidone as the primary solvent, were not tested as the solvent did not appear to dissolve the polyamide-imide resin to a significant degree.

Aluminum coupons were prepared by cleaning with acetone and then wiping each coupon with a sample of the solvent/solvent mixture used in the coating composition to be deposited onto the coupon. For example, the coupon for Example 22 was cleaned with acetone, and then wiped with N-methyl pyrrolidone. An aliquot of each of the coating compositions was placed on their respective coupons, and then dispersed with a doctor blade set to 0.7 mm. The coated coupons were pre-baked in a convection oven at approximately 110° C. for 2 hours. The coupons were then transferred to a vacuum oven at 112° C. and 30 in Hg vacuum for about 18 hours to produce the coatings on the coupons. The pre-bake was necessary to prevent the Examples with N-methyl pyrrolidone from later bubbling under vacuum.

The coatings on the coupons were tested for pencil hardness in accordance with ASTM D3363-05($2011^{E2}$) using a pencil hardness test kit from BYK Gardner, Columbia, MD The coated coupons were held at about 23° C. and 40% to 60% relative humidity for 40 hours prior to pencil hardness testing. The results are shown in Table 3 with H harder than F, which is harder than HB.

TABLE 3

| Example | Composition Example | Solvent | Co-Solvent | Pencil Hardness |
|---|---|---|---|---|
| 22 | 14 | N-methyl pyrrolidone | None | F |
| 23 | 16 | N-methylcaprolactam | None | HB |
| 24 | 17 | N-ethylcaprolactam | None | F |
| 25 | 18 | N-methyl pyrrolidone (70 wt. %) | Cyclohexanone (30 wt. %) | F |
| 26 | 20 | N-methylcaprolactam (70 wt. %) | Cyclohexanone (30 wt. %) | HB |
| 27 | 21 | N-ethylcaprolactam (70 wt. %) | Cyclohexanone (30 wt. %) | H |

As shown in Table 3, Example 27 with the solvent mixture including N-ethylcaprolactam and cyclohexanone was the hardest coating, followed by N-ethylcaprolactam alone (Example 24), and solvents including N-methyl pyrrolidone, either alone (Example 22) or with cyclohexanone (Example 25). The coatings including N-methylcaprolactam, either alone (Example 23) or with cyclohexanone (Example 26) were the softest coatings. Thus, it was surprisingly found that polyamide-imide coating compositions including N-ethylcaprolactam formed the hardest coatings.

What is claimed is:

1. A coated wire, comprising:

a wire; and coating composition disposed on a surface of the wire, comprising:

a polyamide-imide resin, a polyimide resin, a polyesterimide resin, or any two or more of these resins; and one or more caprolactam-derived solvents, wherein the one or more caprolactam-derived solvents comprise N-ethyl caprolactam in an amount of at least 50 wt. %, based on a total weight of solvents in the coating composition.

2. The coated wire of claim 1, wherein the one or more caprolactam-derived solvents is 10 wt. % to 90 wt. % of the total weight of the coating composition.

3. The coated wire of claim 1, wherein the one or more caprolactam-derived solvents includes two caprolactam-derived solvents.

4. The coated wire of claim 3, wherein each of the two caprolactam-derived solvents is from 5 wt. % to 95 wt. % of the one or more caprolactam-derived solvents.

5. The coated wire of claim 3, wherein the two caprolactam-derived solvents are N-ethylcaprolactam and N-butylcaprolactam.

6. The coated wire of claim 3, wherein the two caprolactam-derived solvents are N-ethylcaprolactam and N-(methoxymethyl) caprolactam.

7. The coated wire of claim 3, wherein the two caprolactam-derived solvents are N-ethylcaprolactam and N-(ethoxymethyl) caprolactam.

8. The coated wire of claim 3, further including a third caprolactam-derived solvent.

9. The coated wire of claim 8, wherein each of the three caprolactam-derived solvents is from 5 wt. % to 90 wt. % of the three caprolactam-derived solvents.

10. The coated wire of claim 1, wherein the one or more caprolactam-derived solvents include N-ethylcaprolactam, N-butylcaprolactam, N-(methoxymethyl) caprolactam, and N-(ethoxymethyl) caprolactam.

11. The coated wire of claim 1, wherein the polyamide-imide resin, the polyimide resin, the polyesterimide resin, or the two or more of these resins is less than 80% imidized.

12. The coated wire of claim 1, wherein polyamide-imide resin, the polyimide resin, the polyesterimide resin, or the two or more of these resins is 5 wt. % to 50 wt. % of the coating composition.

13. The coated wire of claim 1, further including a co-solvent, wherein the co-solvent is an organic solvent having a vapor pressure greater than any of the one or more caprolactam-derived solvents.

14. The coated wire of claim 1, wherein the coating composition has a dynamic viscosity ranging from about 500 cP to about 10,000 cP.

15. The coated wire of claim 1, wherein one or more caprolactam-derived solvents comprise N-ethyl caprolactam in an amount of at least 70 wt. %, based on a total weight of solvents in the coating composition.

16. The coated wire of claim 1, wherein one or more caprolactam-derived solvents comprise N-ethyl caprolactam in an amount of at least 90 wt. %, based on a total weight of solvents in the coating composition.

17. The coated wire of claim 1, wherein one or more caprolactam-derived solvents comprise N-ethyl caprolactam in an amount of at least 75 wt. %, based on a total weight of all caprolactam-derived solvents in the coating composition.

18. The coated wire of claim 1, wherein one or more caprolactam-derived solvents consist essentially of N-ethyl caprolactam.

19. The coated wire of claim 1, wherein one or more caprolactam-derived solvents consist of N-ethyl caprolactam.

* * * * *